July 11, 1967  E. EFSTATHIOU  3,330,536
SUDS PRODUCING DEVICE
Filed Feb. 16, 1965  3 Sheets-Sheet 1

Evangelos Efstathiou

July 11, 1967　　　　　　　　E. EFSTATHIOU　　　　　　　3,330,536
　　　　　　　　　　　　　　SUDS PRODUCING DEVICE Filed Feb. 16, 1965　　　　　　　　　　　　　　　　3 Sheets-Sheet 2

Evangelos Efstathiou

July 11, 1967  E. EFSTATHIOU  3,330,536

SUDS PRODUCING DEVICE

Filed Feb. 16, 1965  3 Sheets-Sheet 3

Evangelos Efstathion

United States Patent Office 3,330,536  
Patented July 11, 1967

3,330,536  
SUDS PRODUCING DEVICE  
Evangelos Efstathiou, 35 Elway Court, Apt. 2,  
Toronto 19, Ontario, Canada  
Filed Feb. 16, 1965, Ser. No. 433,221  
Claims priority, application Canada, Jan. 30, 1965,  
922,078  
6 Claims. (Cl. 259—10)

This invention relates to improvements in household appliances and more particularly to improvements in means of producing suds from water and detergent or other soap-like products.

This invention is a further improvement on my patent application Serial No. 374,443 filed June 11, 1964, the present improvement providing simpler and more efficient valving means to regulate the flow of suds, particularly as regards immediate flow of the suds, thereby making the appliance less expensive to manufacture and more suitable for general utilization and more particularly in the home.

It is the object of the present invention to provide an electrically operated appliance for proportioning water and detergent or other soap like material as required, producing a continuous stream of suds controlled by conventional switch means.

It is a further object of the invention to provide a suds producing appliance that may conveniently be located beneath a conventional kitchen sink therefore not taking up space on top of the kitchen table.

There is a further object to this invention to provide a suds producing appliance as above, that may be remotely controlled from a control board located on the kitchen table close to the kitchen sink, through utilization of flexible cable means.

These and other objects and features of this invention will become apparent from the following detailed description and the accompanying drawings in which like numerals refer to like parts throughout the various views.

Figure 1:
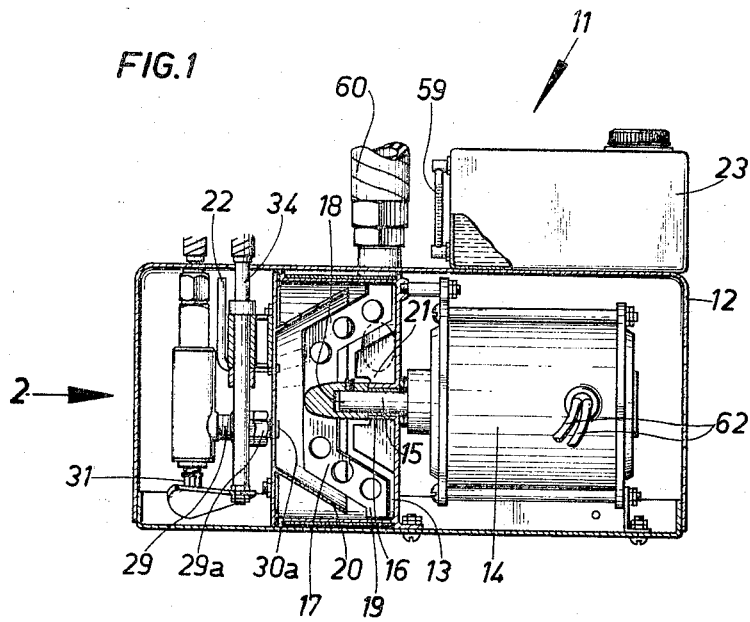
FIGURE 1 is a side elevation of an embodiment of the appliance and shows the mixing chamber in section in order to reveal details therein.

Referring to FIGURE 1, a suds producing device is shown at 11, comprising: a housing 12 having a mixing chamber 13 secured thereto. An electric motor 14 is secured within housing 12 and is provided with a shaft 15 projecting through sealing means 16 into mixing chamber 13. A mixing blade 17 is secured to end 18 of shaft 15, mixing blade 17 having a recessed isosceles trapezoic configuration at its periphery, i.e. a flattened V-configuration with a greater diametrical distance between the blade portions at extreme ends 19 thereof, thereby giving mixing blade 17 centrifugal action. This centrifugal action is accentuated or increased by a correspondingly truncated, substantially close fitting conical shield 20, i.e. a shield having the shape of the frustum of a cone, which covers the outer peripheral contour of blade 17. A corresponding truncated conical shield 21 positioned within the recess of blade 17 is being utilized for the purpose of covering the inner peripheral contour of blade 17.

A breather pipe 22 is located in chamber 13 to permit access of air for mixing with water and detergent or like sudsing compound to provide suds.

Figure 2:
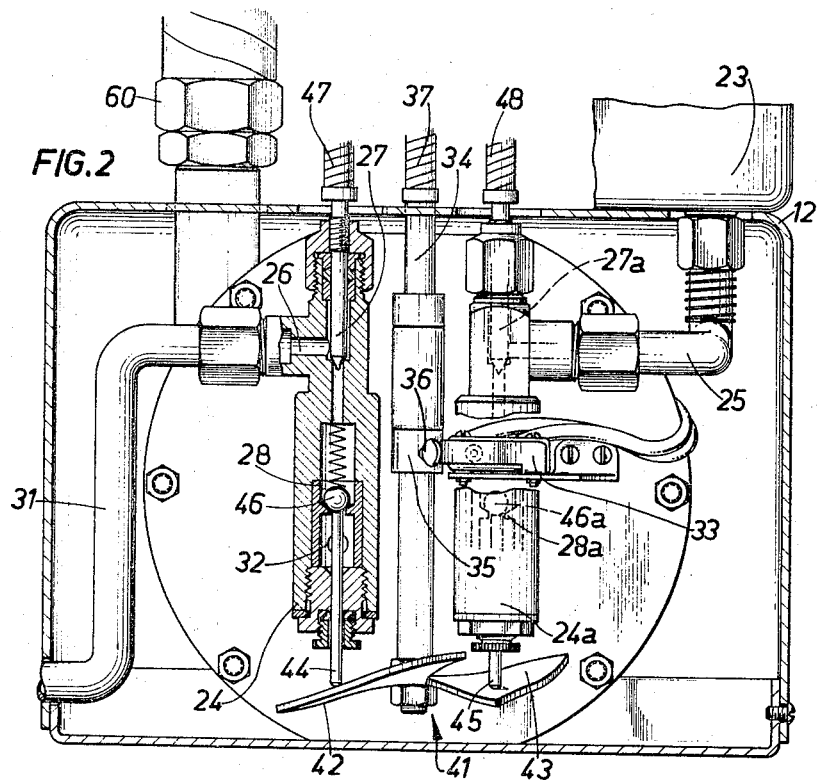
FIGURE 2 is a part sectional fractional end view taken in the direction of arrow 2, in FIGURE 1.
Figure 3:
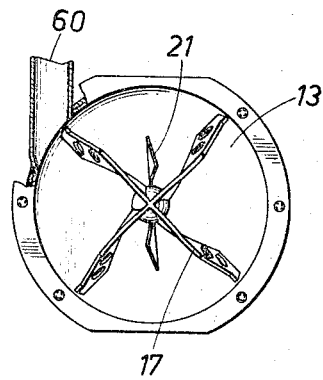
FIGURE 3 is a part sectional end view of the mixing blade located in the mixing chamber of the appliance shown in FIGURE 1, seen in direction of arrow 2.

Referring to FIGURES 1 and 2, a detergent supply tank 23 is shown mounted on housing 12. Two identical combination metering valve and check valve units 24 and 24a are located on mixing chamber 13, a connecting pipe 25 leading from tank 23 to inlet port 26 of a needle valve 27a of valve unit 24a, the lower portions of valve units 24 and 24a containing identical plunger-operated check valves 28 and 28a respectively.

Check valve 28a is supplied with exit tube 29a that opens into chamber 13 at 30a.

Valve 27 is connected to a water-inlet pipe 31 and has an outlet port 32 which permits communication of check valve 28 with chamber 13 by means of connecting pipe 29.

Figure 4:
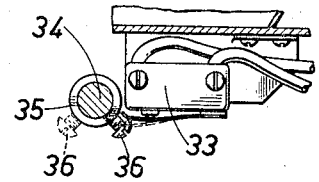
FIGURE 4 is a fractional part sectional plan view of the switching device and control means therefor shown in FIGURE 2.
Figure 5:
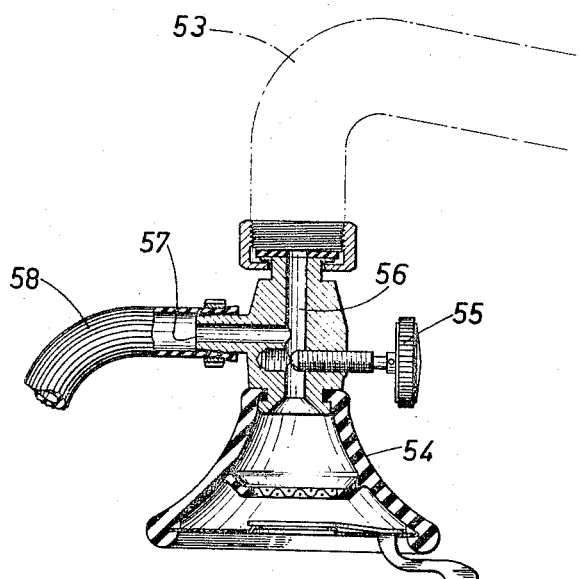
FIGURE 5 is a vertical mid-sectional view of an alternative water supply head for use in conjunction with a conventional water faucet, for selective supply of water to the present invention.
Figure 6:
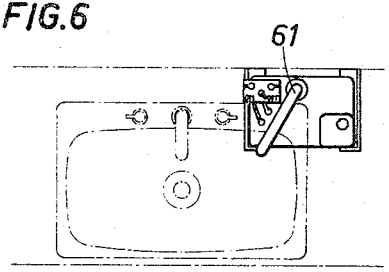
FIGURE 6 is a plan view of an embodiment of the present invention, installed below a kitchen table and sink, shown in phantom, illustrating one method of dispensing suds directly from the appliance.

A switch 33, shown in FIGURES 2 and 4, operates motor 14 and is actuated by an actuating spindle 34 that is rotatably located in housing 12 and carries collar 35 having a projecting screw 36 adapted to make electrical connection in switch 33 upon screw 36 being rotated thereagainst, and break electrical connection in switch 33 upon screw 36 being moved away from switch 33. A flexible cable 37 is attached to spindle 34 and leads to a remote located actuating lever 38 as shown in FIGURES 6, 7, 8 and 9, where actuating lever 38 is located above kitchen table 39 and actuates the suds making appliance 40 located below kitchen table 39, through flexible cable 37.

Spindle 34 carries at its extreme lower end 41 a double vaned blade having vanes 42 and 43 with their planes located at an angle to the perpendicular plane on spindle 34, rotation of spindle 34 causing the angled blades 42 and 43 to bias pins 44 and 45 axially upwards within valves 28 and 28a to move the balls 46 and 46a off the check valve seats, thereby permitting water and detergent to flow into chamber 13; reverse rotation of spindle 34 causing pins 44 and 45 to move downwards thereby permitting the balls 46 and 46a to seat in check-valve 28 and 28a and shut off flow of water and detergent simultaneously.

Figure 7:
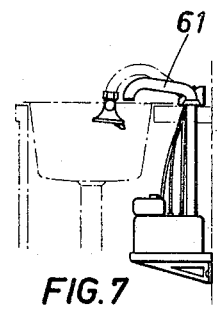
FIGURE 7 is a side view of an embodiment of this invention utilizing the water supply system shown in FIGURE 5.
Figure 8:
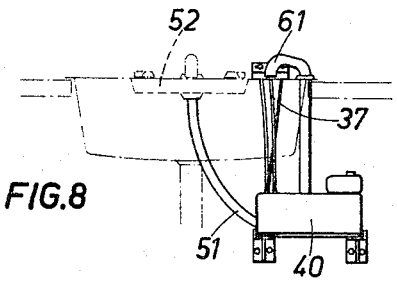
FIGURE 8 is a front elevation of the appliance shown in FIGURE 6, illustrating the method of supplying water from the lower portion of the faucet to the appliance embodying this invention.
Figure 9:
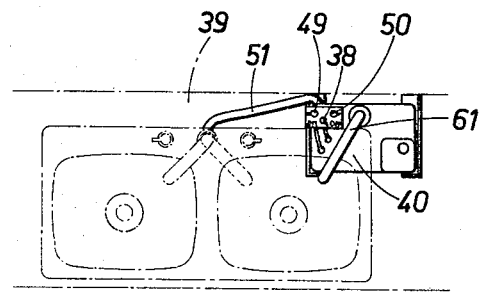
FIGURE 9 is a plan view of the appliance shown in FIGURE 8.

Control of quantity of water in relation to quantity of detergent supplied to chamber 13 is effected by rotating needle valves 27 and 27a by means of flexible cables 47 and 48 that likewise extend to top of kitchen table 39 as shown in FIGURES 7, 8 and 9, cable 47 being connected to lever 49 and cable 48 being connected to lever 50 for selected opening or closing of needle valves 27 and 27a as required.

Water connection to pipe 31 may be made by hose 51, attached beneath conventional water faucet 52 or may be supplied from faucet spout 53 by attaching a sprinkler head 54 having a needle valve 55 located transversely of passageway 56, passageway 57 being located and connected to passageway 56 intermediate of valve 55 and faucet 53, thereby permitting a portion of water to pass through passageway 57, into hose 58 that is connected to pipe 31 and supplies water for mixing with detergent in chamber 13 for production of suds.

A sight glass 59 may be located on tank 23 to visually permit determination of the amount of detergent in tank 23 at all times.

A suds outlet pipe 60 is disposed tangentially to the wall of chamber 13 at its largest diameter which corresponds to the largest diameter of blade 17, full benefit thereby being taken of centrifugal force imparted to the suds being impelled out of chamber 13, pipe 60 leading to a suds dispensing faucet 61 shown in FIGURES 6, 7, 8 and 9.

Operation of the suds making appliance is as follows:

Lever 38 is rotated to actuate switch 33 whereby motor 14 is operated from house current applied to leads 62. Vanes 42 and 43 are simultaneously rotated to open check valves 28 and 28a, thereby permitting access of water and detergent into chamber 13 where these are mixed and turned into suds, said suds propelled by centrifugal force out through pipe 60 to faucet 61 and dispensed therefrom onto dirty dishes and the like. The correct ratio between water and detergent for use in specific purposes is attained by rotating levers 49 and 50 to suitable positions whereby needle valves 27 and 27a will supply the correct amount of water and detergent respectively.

The invention as explained above is particularly suitable for location beneath a kitchen table and therefore out of the way, but the unit may also be located above the kitchen table in a suitable housing as a portable unit without prejudicing the novelty of this invention.

While the invention has been explained and described with the aid of the particular embodiments thereof, it will be understood that the invention is not limited thereby and that many modifications retaining and utilizing the spirit thereof without departing essentially therefrom will occur to those skilled in the art in applying the invention to specific operating environments and conditions.

It is therefore contemplated by the appended claims to cover all such modifications as fall within the scope and spirit of the invention.

The embodiments of this invention in which an exclusive property or privilege is claimed are defined as follows:

1. A suds producing device for mixing water with a sudsing compound to produce washing suds comprising, in combination, a mixing chamber having an air inlet, a motor driven mixing blade rotatably supported within said chamber, a sudsing compound supply tank, a supply line connecting said sudsing compound supply tank with said chamber, a combination metering valve and check valve in series with said sudsing compound supply line, a water supply line for connecting said chamber with a water supply, a combination metering valve and check valve in series with said water supply line, manually controllable switch means for operating said motor, and manually controllable release means for simultaneously opening and closing said check valves.

2. A suds producing device as claimed in claim 1 in which said mixing blade has a flattened V-configuration and has an axis of rotation coincident with its axis of symmetry.

3. In a suds producing device as claimed in claim 2, a portion of said chamber having the shape of the frustum of a cone enveloping the periphery of the mixing blade.

4. In a suds producing device as claimed in claim 3, said chamber having a tangential suds dispensing outlet at its largest diameter.

5. In a suds producing device as claimed in claim 4, extension means operatively connected to the metering valves for opening and closing said valves.

6. In a suds producing device as claimed in claim 5, the manually controllable switch means for operating said motor and manually controllable release means for simultaneously opening and closing said check valves comprising a spindle located intermediate of said check valves and in proximity to the motor switch means, means rotatably carried by said spindle for actuating said check valve release means and means carried by said spindle for actuating said motor switch means whereby rotation of said spindle simultaneously opens said check valves and permits energization of said motor in one position and simultaneously closes said check valves and de-energizes said motor when rotated to another position.

References Cited

UNITED STATES PATENTS

| | | | |
|---|---|---|---|
| 190,395 | 5/1877 | Wiesebrock | 259—10 X |
| 1,169,712 | 1/1916 | Zingali. | |
| 2,052,569 | 9/1936 | Jensen | 259—46 |
| 2,350,095 | 5/1944 | Carlson et al. | 259—96 X |
| 2,716,544 | 10/1955 | Exley et al. | 259—10 |
| 2,814,471 | 11/1957 | Carr et al. | 259—4 |
| 3,249,340 | 5/1966 | Pinto | 259—96 |

BILLY J. WILHITE, *Primary Examiner.*

WALTER A. SCHEEL, *Examiner.*

J. M. BELL, *Assistant Examiner.*